United States Patent
James et al.

(10) Patent No.: US 7,301,961 B1
(45) Date of Patent: Nov. 27, 2007

(54) METHOD AND APPARATUS FOR CONFIGURING SIGNAL LINES ACCORDING TO IDLE CODES

(75) Inventors: David V. James, Palo Alto, CA (US); Jagadeesan Rajamanickam, San Jose, CA (US)

(73) Assignee: Cypress Semiconductor Corportion, San Jose, CA (US)

( * ) Notice: Subject to any disclaimer, the term of this patent is extended or adjusted under 35 U.S.C. 154(b) by 1181 days.

(21) Appl. No.: 10/209,142

(22) Filed: Jul. 31, 2002

Related U.S. Application Data

(60) Provisional application No. 60/343,973, filed on Dec. 27, 2001.

(51) Int. Cl.
*H04J 15/00* (2006.01)
*G08C 19/12* (2006.01)
*H04L 17/02* (2006.01)
*G06F 13/00* (2006.01)

(52) U.S. Cl. .................... 370/464; 341/173; 710/100

(58) Field of Classification Search ............. 370/464, 370/535–536; 341/173–174; 710/100
See application file for complete search history.

(56) References Cited

U.S. PATENT DOCUMENTS

| | | | |
|---|---|---|---|
| 5,790,057 A | 8/1998 | Linde et al. | |
| 5,930,359 A | 7/1999 | Kempke et al. | |
| 6,198,413 B1 | 3/2001 | Widmer | |
| 6,501,396 B1 * | 12/2002 | Kryzak et al. | 341/59 |
| 2001/0044914 A1 * | 11/2001 | Nakano et al. | 714/43 |

OTHER PUBLICATIONS

"IEEE Standard for Scalable Coherent Interface (SCI)", *IEEE Std 1596-1992*, Institute of Electrical and Electronic Engineers, Inc., New York, NY, pp. 4-25 and 47-72, May 23, 2001.

* cited by examiner

*Primary Examiner*—Kevin C. Harper
(74) *Attorney, Agent, or Firm*—Haverstock & Owens LLP

(57) ABSTRACT

A method and apparatus for configuring signal lines with idle codes is disclosed. According to one embodiment, data transmission system (100) may include encoders (112, 114, 116 and 118) that transmit data over signal line lanes (Lane 0 to Lane n). In an idle state, an encoder (112, 114, 116 and 118) may output one of at least two idle codes (IDLE A and IDLE B). One idle code (IDLE A) may indicate a first lane of a group of lanes. Another idle code (IDLE B) may indicate subsequent lanes of a group of lanes.

21 Claims, 12 Drawing Sheets

METHOD AND APPARATUS FOR CONFIGURING SIGNAL LINES ACCORDING TO IDLE CODES

This application claims the benefit of provisional patent application Ser. No. 60/343,973 filed Dec. 27, 2001.

TECHNICAL FIELD

The present invention relates generally to data transmission systems, and more particularly to the configuration of signal lines in a data transmission system.

BACKGROUND OF THE INVENTION

The increasing need for faster data communication rates has led to corresponding needs for faster transmission of data between system components. Networking hardware is but one of the numerous applications in which such increased speed is needed. Within a high-speed router, data is typically transmitted between one or more integrated circuits. If such inter-chip data transmission speeds can be increased (e.g., in the range of 1 gigabits/second per pin), the overall speed/bandwidth of the connection between integrated circuits may also be increased.

Data transmission systems can include shared bus connections, in which bus lines may be commonly shared between multiple devices, and point-to-point connections, in which one device is connected to another by one or more direct signal lines. Bus oriented systems may have a number of drawbacks. Due to the number of devices attached to the bus lines (because they are shared among multiple devices) the inherent capacitance attached to the lines may be large, limiting the speed at which the lines may be effectively driven. Larger lines may consume higher amounts of power, as well. Still further, because a bus is commonly shared, some form of arbitration is typically included to enable one device to have control of the bus at a given time. Such arbitration needs can add to the complexity of the system. It is also noted that the inclusion of a common bus on a circuit board, or the like, requires a dedicated amount of area. This can work against the goal of manufacturing systems that are as physically compact as possible.

Various aspects of conventional data bus approaches will now be described.

A data communication system may have two devices connected by signal lines. Data may be transmitted from one device to another, and in the case of bi-directional buses, vice versa. Conventionally, idle codes may be transmitted from one device to another when no data values are transmitted.

Referring now to FIG. 9A, a conventional data communication system is set forth and designated by the general reference number 900. A conventional data communication system 900 may include two or more devices 902 and 904. Devices 902 and 904 may be connected by a number of signal lines 906. Data may be transmitted from a device 902 to another device 904 as electronic signals, which may be sent through signal lines 906. Signal lines may include data lines and/or a clock line.

Referring now to FIG. 9B, a group of signal lines in a conventional data communication system is set forth. A group of signal lines 906 may contain a number of signal lines 908 and a clock line 910. Signal lines 908 may be used to transmit data and/or control signal in a data communication system 900. A clock line 910 may transmit a periodic clock signal CLK, or the like, that can be used to synchronize a data receiving process at a receiving device.

Signal lines 908 may be configured into byte "lanes." Each byte lane may transmit data in a unit, such as a byte (8-bits). Typically, each byte lane contains eight data lines, each of which may transmit one bit at a time. Thus, a byte lane may transmit one byte of data at a time. Signal lines connecting two or more devices (e.g., a shared bus or point-to-point connection) may include a number of byte lanes; and the byte lanes may be grouped together to transmit multi-byte data. A variety of configurations may be used to group signal lines. FIGS. 9C to 9E are examples of different conventional configurations of signal lines.

Referring now to FIG. 9C, a first example of a conventional configuration of signal lines in a data communication system is set forth. A bus may contain 64 signal lines including L0-L63 and a clock line 912. It is understood that the term "bus" as used herein may include shared type buses and/or point-to-point connections. A bus may be grouped into two double word lanes 914 and 916. Four adjacent byte lanes may be grouped into a double word lane 914 having 32 data lines L0-L31. Another four adjacent byte lanes may be grouped into another double word lane 916 having 32 data lines L32-L63. A clock line 912 may synchronize the signal transmission.

Referring now to FIG. 9D, a second example of a conventional configuration of signal lines in a data communication system 900 is set forth. A bus may be grouped into word lane groups 914, 916, 918 and 920. Each of two adjacent byte lanes may be grouped together to form a word lane. Two adjacent byte lanes (L0-L15) may be grouped into a lane 914. Two adjacent byte lanes (L16-L31) may be grouped into a lane 916. Thus eight byte lanes may be configured into four lane groups 914, 916, 918 and 920. Four group lanes 914, 916, 918 and 920 may simultaneously transmit four signal streams, each of which may transmit one word (two bytes) at a time.

Referring now to FIG. 9E, a third example of a configuration of signal lines in a data communication system 900 is set forth. A bus may be grouped into eight group lanes 922, 924, 926, 928, 930, 932, 934 and 936 and a clock line 912. Each of the byte lanes may represent a separate lane group. That is, a byte lane (L0-L7) may be a lane group 922. A byte lane (L8-L15) may be another lane group 924. Thus eight byte lanes may be configured into 8 group lanes 922, 924, 926, 928, 930, 932, 934 and 936. Eight group lanes 922-936 may transmit eight different data streams, each of which may transmit one byte at a time.

Thus, byte lanes may be configured into data streams of different data sizes. A configuration may have a mix of byte lanes and/or word lanes and/or double-word lanes. By separating byte lanes into different groups, data values may be simultaneously transmitted on the different lane groups between one pair or multiple pairs of sending and receiving devices.

Referring now to FIG. 9F, a conventional approach for signaling a lane grouping configuration is set forth. Before data values are sent through signal lines, a configuration command 938 may be sent to notify a receiving device about a lane grouping configuration.

For example, at time t0, a configuration command 938 may be sent through the byte lanes 0-3 to configure the four byte lanes into two groups 940 and 942. It is understood that the configuration command may be a particular set of bits transmitted over one or more lanes. Further, such a configuration command may consume one or more clock cycles.

Upon receiving such a command, a receiving device may understand that subsequently transmitted data may be logically grouped according to an indicated configuration.

In the example of FIG. 9F, following a transmission of configuration data, data is shown transmitted according to a predetermined configuration. In particular, a first group of data D0-0 and D0-1 may be sent through byte lanes 0-1 940 at t1. A second group of data D1-0 and D1-1 may be sent through different byte lanes 2-3 942, also at time t1.

At time tn, another configuration command 944 may be sent through the data lines to reconfigure the four byte lanes into different groups such as lane groups 946 and 948. Lane group 946 may contain only one byte lane; and lane group 948 may contain three byte lanes. At time tn+1, data D0-0 may be sent through lane group 946 and data D1-0, D1-1 and D1-2 may be sent through lane group 948.

Thus, conventionally, one or more clock cycles may have to be reserved to transmit a configuration command prior to transmitting data.

In addition to lane grouping, another feature of conventional systems can be the use of "idle" codes. Using idle codes typically involves sending idle codes through different signal lines when data is not being transmitted from one device to another.

Referring now to FIG. 9G, a timing diagram is shown that illustrates a conventional use of idle codes for a collection of signals lines (shown as "Byte Lane"). At times t0, t1 and t5, signal lines may be in an idle state. An idle code 950, 952 and 960 may be sent through the signal lines to indicate that no data is being sent. It is understood that an idle code may be a predetermined set of bits that can indicate to a receiving device that data is not being sent.

When data is ready to be sent, idle codes may be replaced by data (which may include control data and/or information data, for example). Thus, in the example of FIG. 9G, before data 956 and 958 are sent through signal lines, a configuration command 954 may be sent that can indicate a lane grouping configuration. It should be noted that an idle code may be sent at any time when no data are being sent.

Conventionally, idle codes have been known that are transmitted and/or selected to reduce a resulting electromagnetic spectrum. In particular, idle codes may be interspersed with transmitted data to thereby reduce peaks in a resulting electromagnetic spectrum. This can reduce overall electronic magnetic interference (EMI). EMI is known to adversely effect data signal quality, which can lead to errors. Thus, such reductions in EMI may result in fewer errors than systems that do not account for a resulting electromagnetic spectrum.

Due to the variety of applications using high speed links, it would be desirable support reconfigurable data paths so that one link can support multi-width and multi-channel communication.

SUMMARY OF THE INVENTION

According to the present invention a method may include transmitting one or more idle codes on a number of signals lines. An idle code may indicate a predetermined configuration for transmitting data over such signal lines.

According to one aspect of the invention, a first idle code may be transmitted on a first portion of a group of signal lines. A second idle code, that is different than a first idle code, may be transmitted on a second portion of the same group of signal lines.

According to another aspect of the embodiments, when a system is in an idle state, a number of idle codes may be transmitted, each on a lane. A lane may include a number of signal lines.

According to another aspect of the embodiments, idle codes may include a "first" lane idle code and a "subsequent" lane idle code. A first lane idle code may indicate a first lane of a group of lanes. A subsequent idle code may indicate a subsequent lane of a group of lanes.

According to another aspect of the embodiments, one idle code may be transmitted when a periodic signal has a first value and a different idle code may be transmitted when a periodic signal has a second value.

According to another aspect of the embodiments, data or idle codes may be output according to an idle indication. An idle indication can signify when certain signal lines are idle.

According to another aspect of the embodiments, outputting data may also include outputting a data code corresponding to a received data value when a periodic signal has a first value, and outputting the complement of the data code corresponding to the received data value when the periodic signal has a second value.

According to another aspect of the embodiments, one of at least two idle codes may be output according to a lane indication. A lane indication can signify when certain signal lines can be a first portion of a group of signal lines or a subsequent group of signal lines.

The present invention may also include a data transmission system. A data transmission system according to the present invention may include one or more encoders. An encoder may output one of at least two idle codes according to a predetermined idle state. Idle codes may be output when the data transmission system is in an idle state.

According to one aspect of the embodiments, two or more idle code sources may be coupled to an encoder. In addition, a data bus may also be coupled to an encoder.

According to another aspect of the embodiments, one or more lane control lines may be coupled to an encoder. Lane control lines can provide signal line configuration information.

According to another aspect of the embodiments, an encoder may include a controllable data path. A controllable data path may provide a first idle code when one or more lane control lines indicates a first portion of a group of signal lines. A second idle code may be provided when one or more control lines indicates a subsequent portion of a group of signal lines.

According to another aspect of the embodiments, an encoder may be coupled to one or more idle control lines. Idle control lines can indicate an idle state.

According to another aspect of the embodiments, a data bus can be coupled to an encoder. A data bus may provide data values.

According to another aspect of the embodiments, a data transmission system may include a number of encoders. Each encoder can be connected to a group of signal lines. Each group of signal lines may represent a lane. Each lane may include a strobe line for transmitting a periodic signal.

According to another aspect of the embodiments, an encoder may include a controllable data path between two idle code sources and an output bus enabled according to a strobe signal.

The present invention may also include a coding system. The coding system may include selecting a code from a set of codes configured for idle communication links.

According to one aspect of the embodiments, a link may include a number of data lanes. A first code value can designate a first portion of a data lane. Additionally, a second code value can designate remaining portions of a data lane.

According to another aspect of the embodiments, communication links may include one or more clock links. A clock link may transmit a periodic signal having a first portion and second portion. Data links can transmit encoded data values on first and second portions of the periodic signal. In addition, data links may transmit a same encoded value when idle.

DETAILED DESCRIPTION OF THE EMBODIMENTS

Various embodiments of the present invention will now be discussed in conjunction with a number of figures. The embodiments set forth methods and systems for configuring signal lines in a data transmission system.

Figure 1:
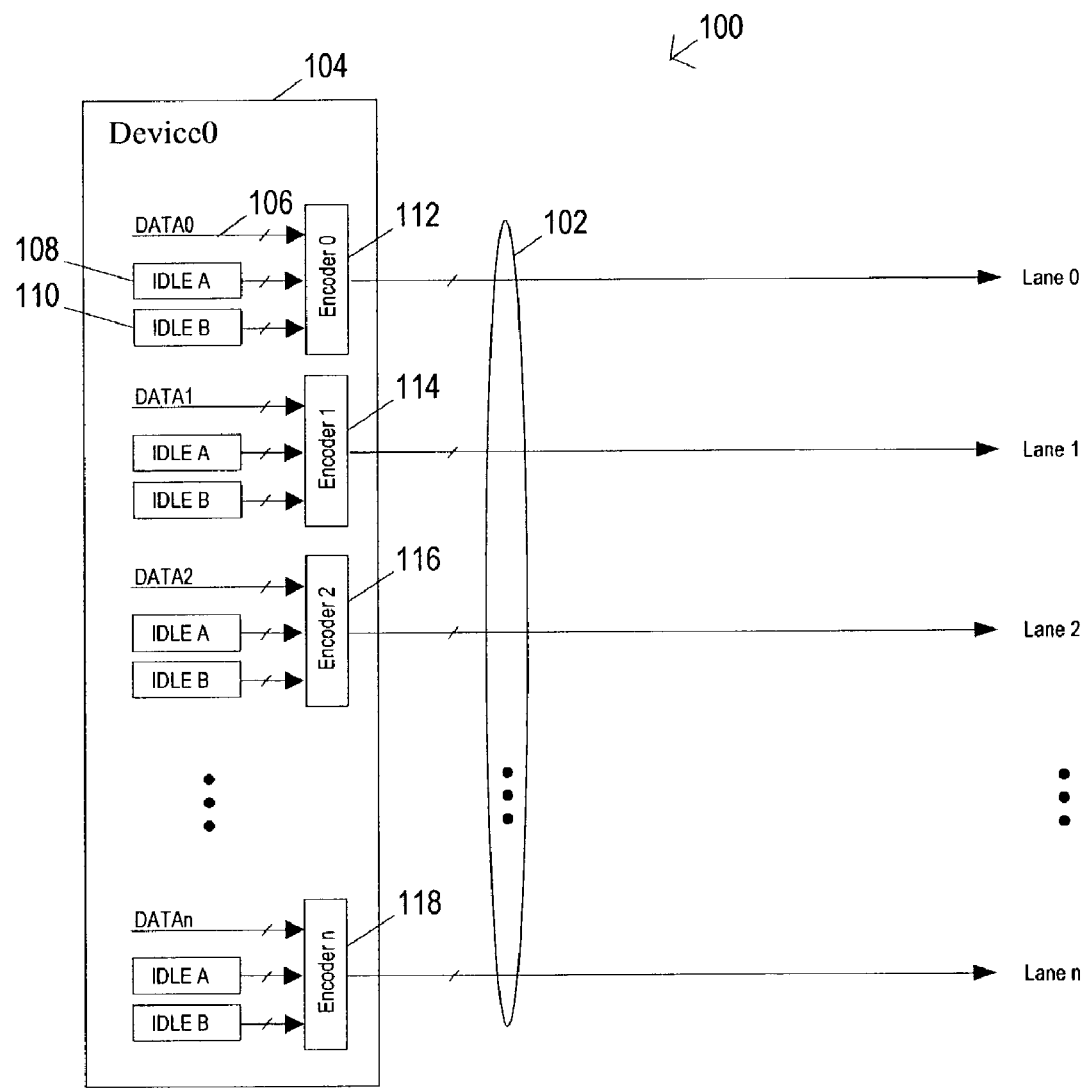
FIG. 1 is a block diagram of a data transmission system according to a first embodiment of the present invention.

Referring now to FIG. 1, a data transmission system according to a first embodiment of the present invention is set forth and designated by the general reference number 100. A data transmission system according to a first embodiment may include a device 104 and that may be connected to signal lines arranged into two or more lanes 0-n 102. A device 104 may transmit data over lanes 0-n 102 by way of a number of encoders 0-n (shown as items 112, 114, 116 and 118).

It is understood that a "lane" as used herein should not be construed as being limited to a particular number of signal lines. A lane may include two or more signal lines, or more than eight signal lines, as but a few examples.

In the example of FIG. 1, each encoder (112-118) may transmit data values or idle codes through a corresponding lane. While in an idle state, an encoder (112-118) may output one of at least two different idle codes. In FIG. 1, idle codes may include a code IDLE A 108 or IDLE B 110, either of which may be indicative of an idle state.

According to the present invention, one idle code may indicate a first lane of a group of lanes, while another idle code may indicate a subsequent lane of the same group. As but one example, an idle code IDLE A (e.g., 108) transmitted on a lane may indicate that the corresponding lane is the first lane in a lane group, and an idle code IDLE B (e.g., 110) transmitted on a lane may indicate that the corresponding lane is a subsequent lane of the group.

Thus, in a device 104, an encoder (112 to 118) connecting to a lane may transmit an idle code IDLE A when the corresponding lane is the first lane in a lane group; and an idle code IDLE B when the corresponding lane is not the first lane in a lane group. When data is available for transmission, an encoder may transmit such data as codes according to an encoding method.

As but one very particular example, if data DATA0 is received by an Encoder 0 112, Encoder 0 112 may encode such data and transmit the encoded data on Lane 0. Once data transmission is complete, Lane 0 is no longer transmitting data and thus is idle. Consequently, an Encoder0 112 may transmit an idle code IDLE A 108 if Lane 0 is a first lane of a group, or may transmit an idle code IDLE B 110, if Lane 0 is not a first lane of a group.

It is understood that other encoders 114 to 116 may operate in the same general fashion as Encoder 0 112, as described above. It is also noted that in some arrangements, groups of lanes may always start at a particular lane. For example, Lane 0 as shown in FIG. 1 could always represent a first lane. Consequently, an Encoder 0 connected to such a lane may always be a "first" byte lane, and would not necessarily have to be capable of providing an idle code IDLE B, as it could always be a first byte lane in a group.

Figure 2:
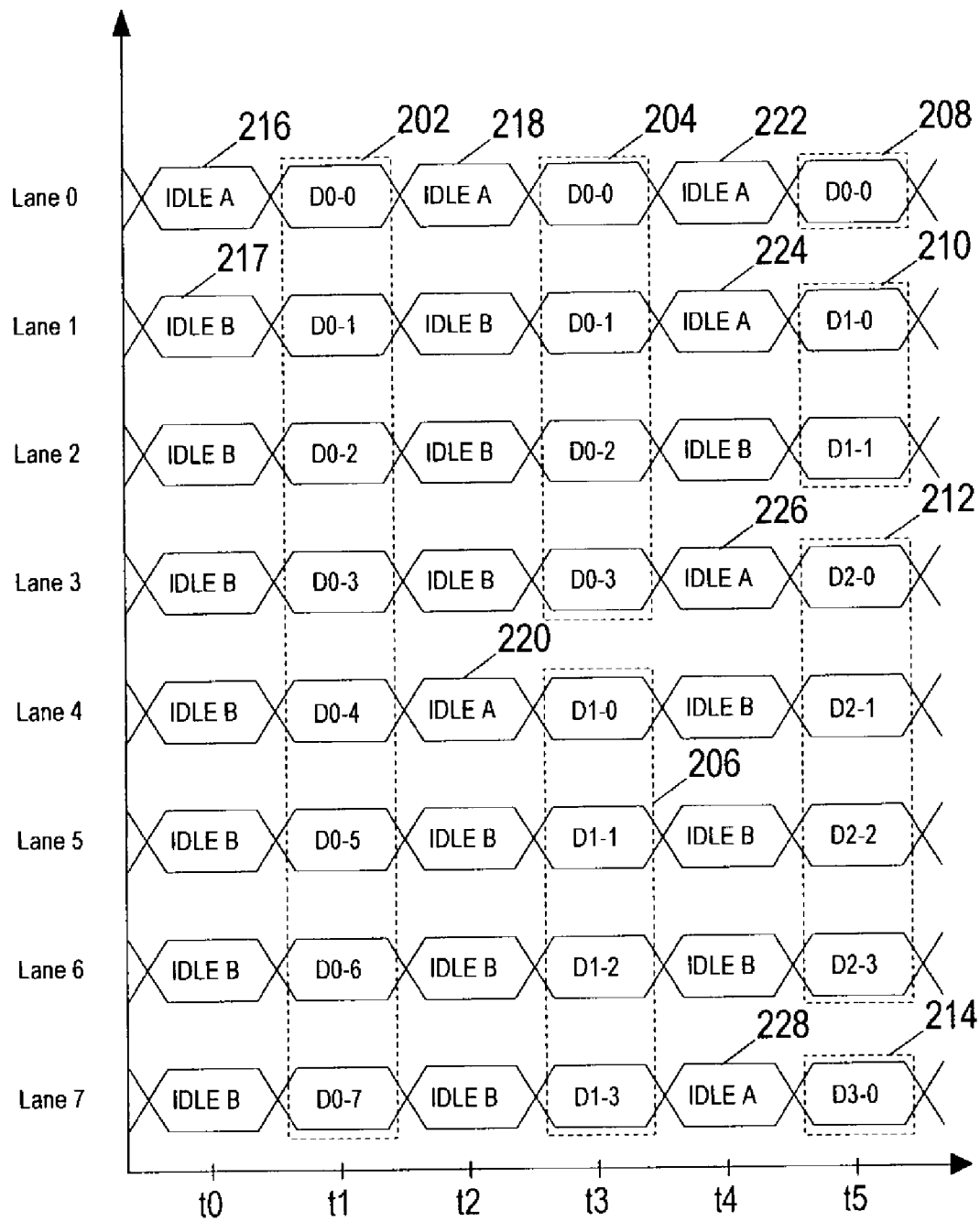
FIG. 2 is a timing diagram showing a configuration method system according to a second embodiment of the present invention.

Referring now to FIG. 2, a configuration method for a data communication system according to a second embodiment of the present invention is shown in a timing diagram. A configuration method according to a second embodiment may include transmitting data along multiple lanes, where grouping of lanes may be indicated by idle codes preceding transmitted data. A lane may include a predetermined number of signal lines.

According to one approach, a method may include transmitting an idle code down lanes that may be arranged in groups of lanes. A start of a lane group may be indicated by transmitting a first idle code (e.g., IDLE A). Any other lanes of a group (i.e., non-first lanes) may be indicated by transmitting one or more idle codes (e.g., IDLE B) that are different than the first idle code. A start of a next group of lanes may be indicated by transmitting a first idle code (IDLE A) once again.

The particular example of FIG. 2 shows signals that may be transmitted over eight lanes (Lanes 0-7). Three changes in configuration for the eight lanes are shown. In FIG. 2, lane grouping may be configured according to different idle codes (IDLE A and IDLE B). In particular, idle codes (IDLE A and/or IDLE B) may first be transmitted to establish a configuration. Data may then be transmitted according to such a configuration.

In FIG. 2, an idle code IDLE A may represent the first lane of a lane group. An idle code IDLE B may represent the rest of the adjacent lanes in the same lane group.

Referring now to FIG. 2, at time t0, all eight lanes may be in an idle state. A first idle code 216 IDLE A may be sent through lane 0, indicating that lane 0 can be a first lane of a lane group. A second idle code 217 IDLE B, that is different than a first idle code 216 IDLE A, may be sent through remaining byte lanes 1-7 at time t0. Such an operation can indicate that such remaining lanes (lanes 1-7) belong to the same group as lane 0. Thus, the particular idle code arrangement shown at time t0 may indicate a configuration that lanes 0-7 are to be grouped in a single group to transmit a set of data values.

At time t1, it is assumed that idle code values indicated at time t0 have established the one group configuration. Thus, data values D0-1 to D0-7 may be transmitted according to the configuration indicated by idle codes sent at time t0. That is, data transmitted along lanes 0-7 represent data from a same lane group (D0) divided into eight portions (D0-0 to D0-7). Thus, lanes 0-7 can be considered a single lane group 202.

At time t2, it is assumed that data being transmitted according to a configuration shown at time t1 has been completed. Thus, lanes 0-7 can return to an idle state. However, unlike conventional approaches, codes transmitted in an idle state may indicate configuration for subsequently transmitted data. In the particular example of FIG. 2, at time t2 a new idle code combination may indicate that eight lanes 0-7 are divided into two lane groups that may represent a separate grouping of data.

Thus, at time t2 an idle code IDLE A 218 and 220 may be sent in lane 0 and lane 4 to represent a first lane of each of the two lane groups. Specifically, an idle code IDLE A 218 may be sent through lane 0 to indicate that lane 0 is the first lane of a first lane group. An idle code IDLE B may be sent through lanes 1-3, indicating that these lanes are to be grouped with the first lane 0. In this way, a configuration for a first lane group may be established that includes lanes 0-3.

Similarly, an idle code IDLE A 220 may be sent through lane 4 to indicate that lane 4 is the first lane of a second lane group. An idle code IDLE B may be sent through lanes 5-7, indicating that these lanes are to be grouped with the first lane 4. In this way, a configuration for a second lane group may be established that includes lanes 4-7.

Thus, two sets of idle codes sent at time t2 may reconfigure 8 lanes in a data communication system from one lane group having eight lanes (0-7) into two lane groups, each of which may include four lanes (lanes 0-3 and lanes 4-7).

At time t3, it is assumed that idle code values indicated at time t2 have established the two lane group configuration. Thus, at time t3 data values may be transmitted according to the configuration encoded by the idle codes sent at time t2. That is, data values may be transmitted through two lane groups. More specifically, the data values transmitted along lanes 0-3 may represent data from a first lane group (D0) divided into four portions (D0-0 to D0-3), and data values transmitted along lanes 4-7 may represent data from a second lane group (D1) divided into four portions (D1-0 to D1-3).

At time t4, it is assumed that data being transmitted according to a configuration shown at time t3 has been completed. Thus, lanes 0-7 can once again return to an idle state. However, once again, an idle state may indicate a new configuration for subsequently transmitted data. In the particular example of FIG. 2, at time t4 idle codes may indicate that eight lanes 0-7 may be divided into four lane groups. A first lane of each lane group may be represented by an idle code IDLE A, and the rest of the lanes in the same lane group (if any) may be represented by an idle code IDLE B.

Specifically, an idle code IDLE A 222, 224, 226 and 228 may be sent at time t4 in lanes 0, 1, 3 and 7, respectively, to represent a first lane of each of the four lane groups. More specifically, an idle code IDLE A 222 may be sent through byte lane 0 to indicate that lane 0 is the first lane of a first lane group.

An idle code IDLE A 224 may be sent through lane 1 to indicate that lane 1 is a first lane of a second lane group. Because idle code IDLE A 224 is in a lane that immediately follows idle code IDLE A 222 in lane 0, this can indicate that lane 0 is a lane group of its own (i.e., a lane group that includes only lane 0). An idle code IDLE B sent through lane 2 may indicate that lane 2 belongs to the same second lane group as lane 1.

An idle code IDLE A 226 may be sent through byte lane 3 to indicate that byte lane 3 can be a first lane of a third lane group. An idle code IDLE B may be sent through lanes 4-6, indicating these lanes are to be grouped with a first lane 3 to form a third lane group having lanes 3-6.

An idle code IDLE A 228 may be sent through a lane 7 to indicate that lane 7 can be a first lane of a fourth lane group. Because, no lanes are shown to follow lane 7, this can indicate that lane 7 is a lane group of its own (i.e., a lane group that includes only lane 7).

In this way, the four sets of idle codes sent at time t4 and may reconfigure eight byte lanes previously arranged into two lane groups to a new configuration that includes four lane groups. In the particular example shown, a first lane group may have lane 0, a second lane group may have lanes 1-2, a third lane group may have lanes 3-6, and a fourth lane group may have lane 7.

Subsequently, at time t5, data values may be transmitted according to the configuration established by idle codes sent at time t4. More specifically, the data values transmitted along lane 0 may represent data from a first lane group (D0) that includes one portion (D0-0), data values transmitted along lanes 1 and 2 may represent data from a second lane group (D1) that includes two portions (D1-0 and D1-1), data values transmitted along lanes 3 to 6 may represent data from a third lane group (D2) that includes four portions (D2-0 to D2-3), and data values transmitted along lane 7 may represent data from a fourth lane group (D3) that includes one portion (D3-0).

In this way, at time t5, four lane groups may transmit data values according to the configuration encoded by the four sets of the idle codes sent at t4.

Therefore, in a method according to a second embodiment, data values may be transmitted in one or more lane groups according to different configurations established by idle codes sent at a prior time.

It is noted that FIGS. 1 and 2 may also be conceptualized as a coding system. The coding system may select a particular idle code (e.g., IDLE A or IDLE B) for signal lines that are idle. This is in contrast to conventional approaches that may employ a single idle code.

Figure 3:
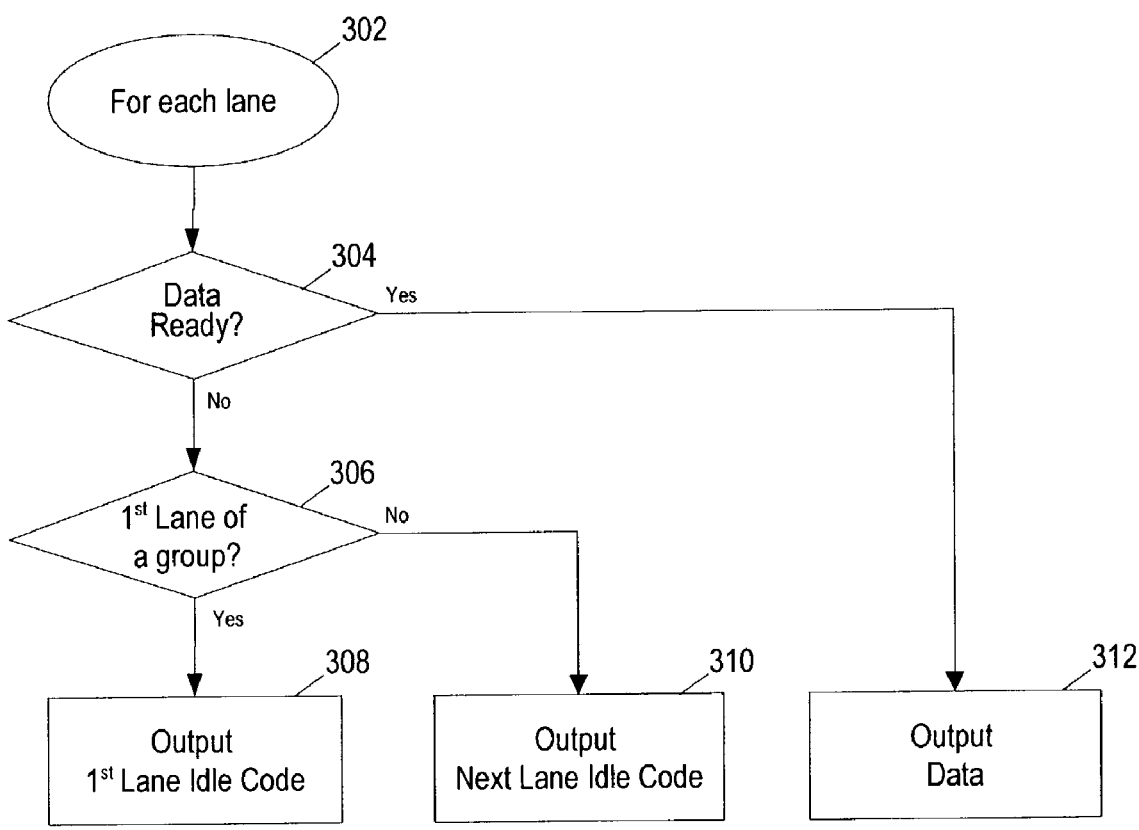
FIG. 3 is a flow diagram showing a method according to another embodiment of the present invention.

Referring now to FIG. 3, a lane configuring method according to an embodiment is shown in a flow diagram and designated by a general reference 300. A method according to FIG. 3 may occur on a lane by lane basis. Thus, a method 300 may include examining each lane of a multiple lane arrangement (step 302). A lane may be checked to see if data is ready for data transmission (step 304). If data is ready, data may be output on the lane (step 312). If data is not ready, a lane can be idle. A lane may then be checked to see whether the lane is a first lane of a lane group (step 306). If a lane is not a first lane of a lane group, a "next lane" idle code may be output (step 310). One example of a "next lane" idle code can be idle code IDLE B shown in FIGS. 1 and 2. If a lane is a first lane of a lane group, a "first" idle code may be output (step 308). One example of a "first lane" idle code can be idle code IDLE A shown in FIGS. 1 and 2.

In this way, a lane signaling method may include transmitting either a first lane idle code or a non-first lane idle code (i.e., a subsequent lane idle code) when a lane of signal lines is idle. Accordingly, idle codes do not only represent an idle state, or are employed to reduce electromagnetic interference (EMI), but can also represent a signal line configuration.

Figure 4:
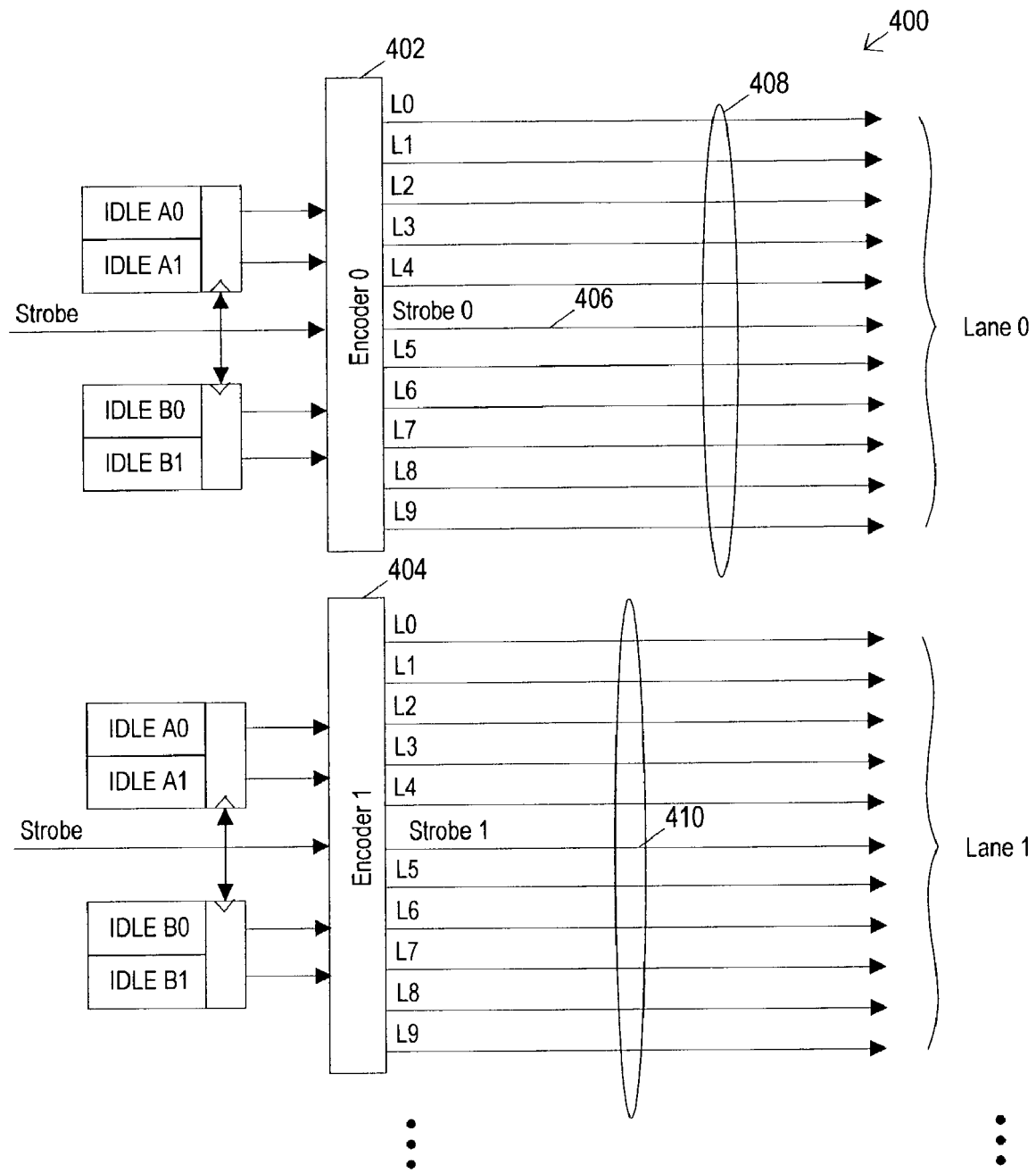
FIG. 4 is a block diagram of a data communication system according to a third embodiment of the present invention.

Referring now to FIG. 4, a data communication system according to a third embodiment of the present invention is set forth in a block diagram and designated by the general reference number 400. A data communication system 400 according to a third embodiment may include one or more encoders that may each be connected to a lane of signal lines. A lane of signal lines may include one or more "strobe" lines and multiple signal lines. In the very particular example of FIG. 4, each lane may include 10 signal lines and one strobe line.

FIG. 4 specifically shows an encoder 0 402 that may be connected to a lane 0. A lane 0 408 may have ten signal lines L0-L9 and a strobe line Strobe 0 406. Encoder 1 404 may be connected to a lane 1 410. A lane 1 may have ten signal lines L0-L9 and a strobe line Strobe 1. A strobe line (Strobe 0 or 1) may carry a timing signal that may periodically transition between 0 (low) to 1 (high).

An encoder (402 or 404) according to a third embodiment may receive at least two different types of idle values, however such values may be encoded differently depending upon whether a strobe signal is high, or is low. Thus, in FIG. 4, each encoder (402 or 404) can output a "first" lane idle code IDLE A0 or IDLE A1, or a "next" lane idle code IDLE B0 or IDLE B1, depending upon whether or not a strobe signal (Strobe 0 or Strobe 1) is high or low. More particularly, if an idle lane represents a first lane and a strobe signal is high, an idle code IDLE A1 may be output on the lane. If an idle lane represents a first lane and a strobe signal is low, an idle code IDLE A0 may be output on the lane. Similarly, if an idle lane does not represent a first lane and a strobe signal is high, an idle code IDLE B1 may be output on the lane. If an idle lane does not represent a first lane and a strobe signal is low, an idle code IDLE B0 may be output on the lane.

In this way, an encoder may output an idle code that represents a first lane of a lane group, where such idle code can vary according to a strobe signal. In addition, an encoder may output an idle code on lanes other than a first lane of a lane group, where such an idle code may also vary according to a strobe signal.

In one very particular arrangement, different values of a same idle code may be complements of one another. That is, an idle code IDLE A0 may be the complement of idle code IDLE A1, and/or an idle code IDLE B0 may be the complement of idle code IDLE B1.

Figure 5:
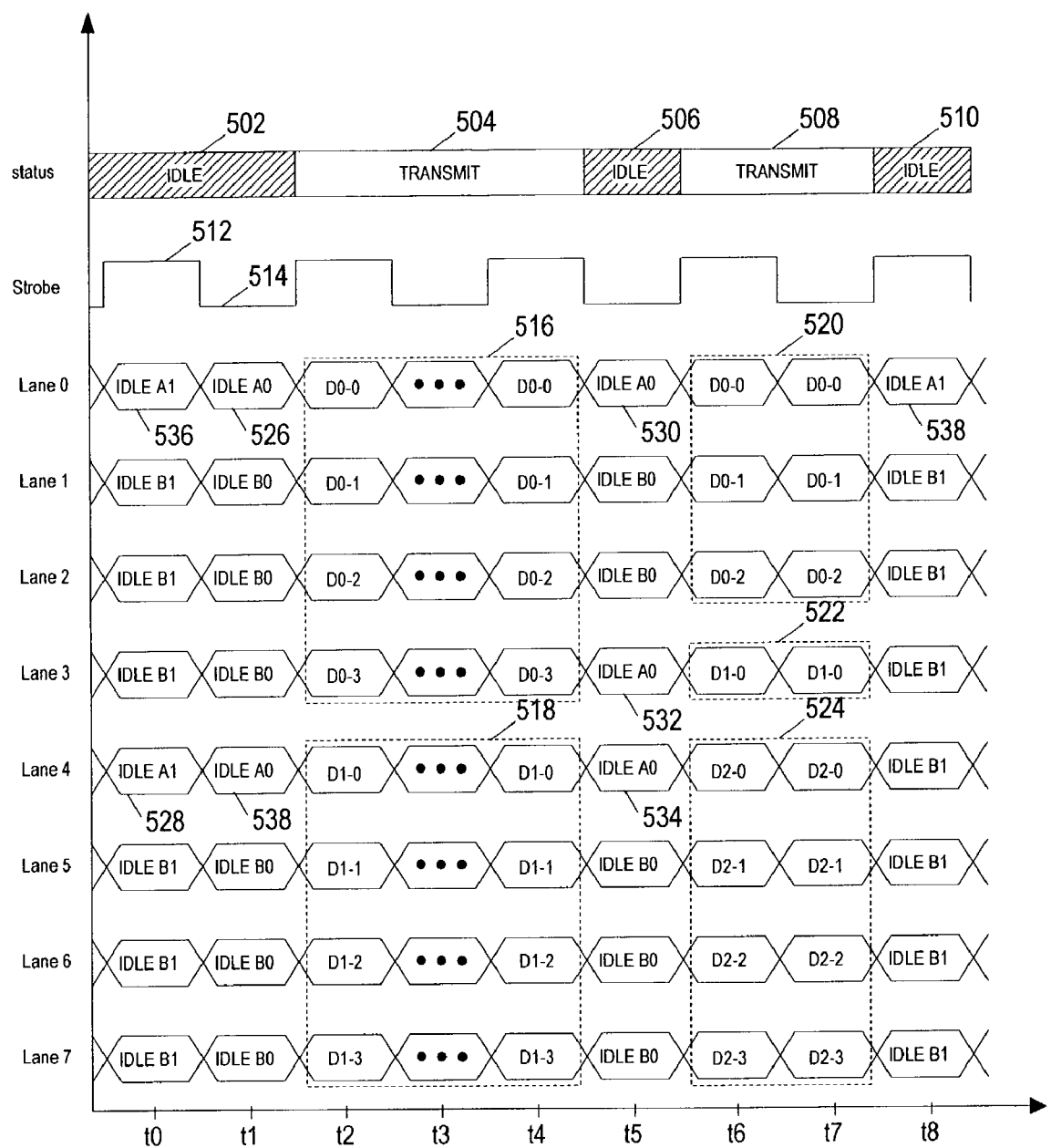
FIG. 5 is a timing diagram showing a configuration method according to a third embodiment of the present invention.

Referring now to FIG. 5, a timing diagram is set forth illustrating configuration method for a data communication system according to another embodiment of the present invention.

A method according to FIG. 5 may include transmitting idle codes down lanes along with a periodic strobe signal. In one arrangement, idle codes may remain the same regardless of a strobe signal value. In another arrangement, idle codes may vary according to a strobe signal. As in the case of the previously described embodiments, idle codes may distinguish particular lane groupings.

A first example will now be described in which idle codes vary according to a strobe signal.

More particularly, a start of a lane group may be indicated by transmitting a version of a first idle code (e.g., IDLE A0 or IDLE A1). Any other lanes of a same group may be indicated by transmitting a version of one or more different idle codes (e.g., IDLE B0 or IDLE B 1).

The particular example of FIG. 5 shows signals that may be transmitted over eight lanes (Byte Lanes 0-7). A configuration for three different lane group combinations is shown. In FIG. 5, lane grouping may be configured according to different idle codes (IDLE A0/1 and IDLE B0/1). In particular, idle codes (IDLE A0/1 and/or IDLE B0/1) may first be transmitted to establish a configuration. Data may then be transmitted according to such a configuration.

In FIG. 5, an idle code IDLE A0 or IDLE A1 may represent a first lane of a lane group. An idle code IDLE B0 or IDLE B1 may represent the rest of the adjacent lanes in the same lane group. Idle codes may vary according to a strobe signal Strobe.

A strobe signal Strobe may transition between two states, a high state and a low state. Such a transitioning may be periodic as shown in FIG. 5. Preferably, data (either data for transmission and/or idle codes) may be transmitted during each of these states. Further, a transmitted data value may be encoded differently according to a strobe signal state. More particularly, a transmitted data value may have one set of bits when a strobe signal is high, and a complementary set of bits when a strobe signal is low.

Referring now to FIG. 5, at t0, a strobe signal may be high 512. Also at this time, the various lanes (Lane 0 to Lane 7) may be idle, and hence may transmit idle codes that establish a lane grouping. However, as noted above, such idle codes may vary according to a strobe signal value. Because strobe signal is high, an idle code IDLE A1 may represent a first lane of a lane group, while an idle code IDLE B1 may represent any subsequent lanes of a lane group.

Thus, at times t0 idle code IDLE A1 536 may be sent through lane 0 to indicate that a lane 0 is a first lane of a lane group. Similarly, an idle code IDLE A1 528 may be sent at t0 through byte lane 4 to indicate that a byte lane 4 is a first lane of another group. At the same time, an idle code IDLE B1 may be sent through other lanes, lanes 1-3 and 5-7. Such idle codes IDLE B1 at time t0 may indicate that lanes 0-3 are one lane group and that lanes 4-7 may belong to another lane group.

At times t1, the various lanes (Lane 0 to Lane 7) may still be in an idle state. However, a strobe signal Strobe may transition to a low state 514. Thus, idle codes may change values while still indicating a same lane grouping. More particularly, idle code IDLE A0 526 may be sent through lane 0 to indicate that lane 0 is a first lane of a lane group. Similarly, an idle code IDLE A0 538 may be sent at t1 through lane 4 to indicate that a lane 4 is the first lane of another group. An idle code IDLE B0 may be sent through other lanes, lanes 1-3 and 5-7. In this way, even though idle codes have changed in response to a strobe transition, such idle codes continue to indicate that lanes 0-3 belong to one lane group and that lanes 4-7 belong to another group.

Subsequently at times t2, t3 and t4, the lanes may be in a transmit state 504. Data values may be transmitted according to a lane grouping indicated by idle codes at times t0 and t1 (idle state 502). Thus, data may be transmitted in two lane groups 516 and 518. More specifically, data values transmitted along lanes 0-3 may represent data from a first lane group (D0) that includes four portions (D0-0 to D0-3), and data values transmitted along lanes 4-7 may represent data from a second lane group (D1) that includes four portions (D1-0 to D1-3)

At time t5, it is assumed that data transmission has been completed and lanes 0-7 return to an idle state 506. Because a strobe signal Strobe is in a low state, IDLE A0 and IDLE B0 may be used to establish lane grouping.

In the particular example shown, an idle code IDLE A0 530, 532 and 534 may be sent through lane 0, lane 3 and lane 4, indicating that such lanes are first lanes of three different lane groups. An idle code IDLE B0 may be sent through the other lanes (lanes 1, 2, 5-7), indicating these lanes are to be grouped with the corresponding first lanes. Thus, lanes 1-2 may be grouped with lane 0 to form a first lane group, lane 3 may form a second lane group by itself, and lanes 5-7 may be grouped with lane 4 to form a third lane group.

Subsequently at times t6 and t7, lanes 0-7 may once again enter a transmit state 508. Thus, data values may be transmitted through three lane groups according to the configuration indicated by the idle codes sent at time t5. More particularly, data portions D0-0 to D0-2 may be sent in a lane group 520 that includes lanes 0-3. Data portion D1-0 may be sent in a lane group 522 that includes lane 3. Data portions D2-0 to D2-3 may be sent in a lane group 524 that includes lanes 4-7.

At time t8, the signal lines may go back to an idle state 510. Another set of idle codes may be sent through the signal lines to reconfigure the lane groups. Because at time t8 a strobe signal is high, idle codes IDLE A1 and IDLE B1 may be used to establish a lane grouping.

In the particular example of FIG. 5, at time t8 an idle code IDLE A1 538 may be sent on lane 0, and idle code IDLE B1 may be send on all other lanes. Thus, according to the idle codes sent at time t8, lanes 0-7 may be reconfigured into a single group.

In this way, idle codes transmitted on signal lines may configure lanes into groups, where such idle codes vary according to a periodic strobe signal.

Of course, as noted above, an idle code may not vary according to a strobe signal. Instead, data values may be encoded to have different values depending upon a strobe value.

Figure 6:
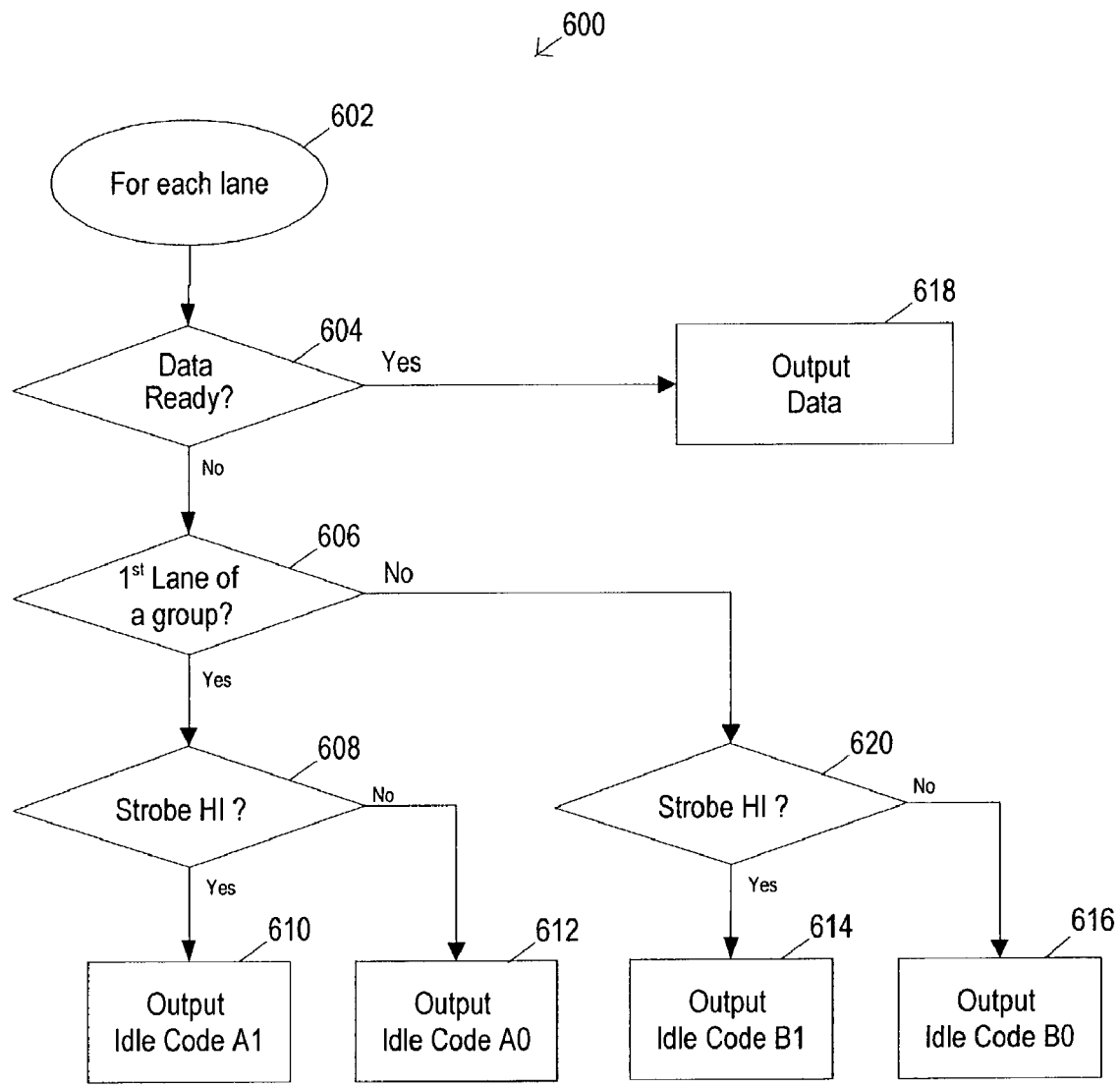
FIG. 6 is a flow diagram showing a method according to another embodiment of the present invention.

Referring now to FIG. 6, a configuration method according to one embodiment of the present invention is set forth and designated by the general reference number 600. A method 600 may include sending particular values down signal lines on a lane by lane basis. Thus, lanes may be considered individually (step 602).

A lane may be checked to see if data is ready for transmission (step 604). If data is ready for transmission, such data may be output on the lane (step 618). However, if data is not ready for transmission, an idle state may be indicated by transmitting an idle code that establishes a lane grouping configuration.

In the particular case of FIG. 6, a lane may be checked to see if it is a first lane of lane group (step 606). If a lane is a first lane of a group, an idle code may be output according to a strobe value (step 608). In particular, an idle code A1 (e.g., IDLE A1) may be output if a step 608 determines a strobe signal is in a high state (step 610). However, an idle code A0 (e.g., IDLE A0) may be output if a step 608 determines that a strobe signal is in a low state.

If a lane is not a first lane of a group, a different idle code may be output according to a strobe value (step 620). More particularly, an idle code B1 (e.g., IDLE B1) may be output if a step 620 determines a strobe signal is in a high state (step 614). An idle code B0 (IDLE B0) may be output if a step 620 determines a strobe is in a low state.

Thus, for each lane 602, an operation 604 may determine whether the corresponding lane is in an idle state. If an operation 604 determines that the lane is not in an idle state, an operation 618 may output data for transmission on the lane. Otherwise, an operation 606 may determine whether the corresponding lane is a first lane in a lane group.

If an operation 606 determines that the corresponding lane is the first lane in a lane group, an operation 608 may continue to determine whether the strobe is in a high or low state at a particular time. When an operation 608 determines that the strobe line is in a high state, an idle code A1 may be output for transmission on the lane in an operation 610. When an operation 608 determines that the strobe line is low, an idle code A0 may be outputted for transmission on the lane in an operation 612.

If an operation 606 determines that the corresponding lane is not a first lane in a group, an operation 620 may continue to determine whether the strobe is in a high or low state at a particular time. When an operation 620 determines that a strobe is in a high state, an idle code B1 may be output for transmission on a lane in an operation 614. When an operation 620 determines that the strobe line is in a low state, an idle code B0 may be output for transmission on a lane in an operation 616.

An idle code B1 may be different from an idle code A1. An idle code B0 may be different from an idle code A0. Similarly, an idle code A0 may be different from an idle code A1 (e.g., complements of one another) and/or an idle code B0 may be different from an idle code B1 (e.g., complements of one another).

In this way a configuration method may output idle codes that establish lane group configurations and that vary according to a periodic strobe signal.

Figure 7:
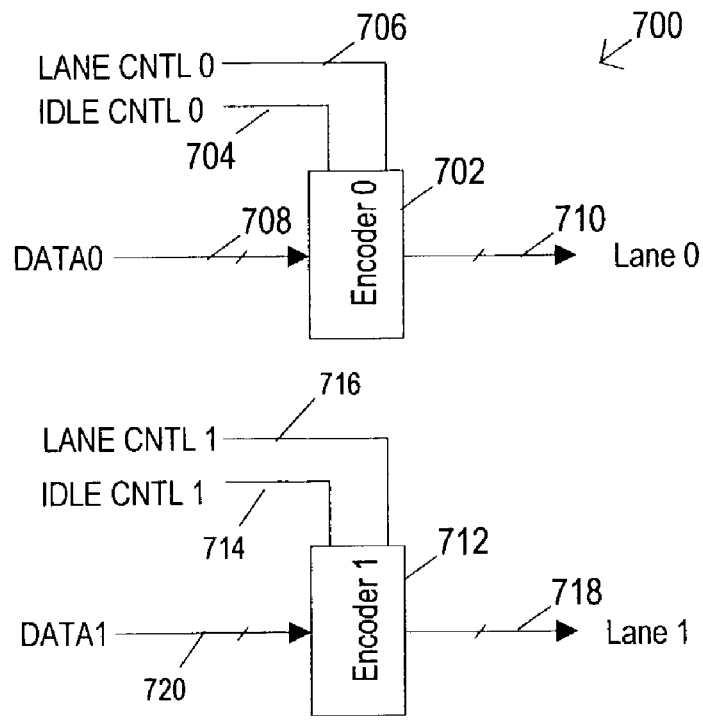
FIG. 7 is a block diagram of a data communication system according to a fourth embodiment of the present invention.

Referring now to FIG. 7, a data communication system according to a fourth embodiment of the present invention is set forth and designated by the general reference number 700. A data communication system according to a fourth embodiment of the present invention 700 may include one or more encoders (702 and 712).

Encoders 702 and 712 may transmit output data values or idle code values on a signal line lanes 710 and 718, respectively. In addition, encoders (702 and 712) may receive data on data buses 708 and 720, respectively. What particular signals are transmitted over lanes 710 and 718 may vary according to received control signals.

According to one embodiment, each encoder (702 and 712) may receive control signals that indicate an idle state and a lane order. An idle state may indicate that idle codes may be transmitted over a lane. A lane order may indicate if a lane is a first lane of a lane group.

In the particular example of FIG. 7, Encoder 0 702 may receive at least one lane control signal LANE CTRL 0 706 and at least one idle control signal IDLE CNTL 0 704. Similarly, Encoder 1 712 may receive at least one lane control signal LANE CTRL 1 716 and at least one idle control signal IDLE CNTL 1 714.

The operation of one encoder 702 will now be described. It is understood that encoder 712 may operate in the same general fashion.

When an IDLE CNTL 0 signal 704 indicates that corresponding lane 0 710 is not idle, an encoder 702 may transmit input data DATA0 from a data bus 708 on corresponding lane 0 710. Such input data may be encoded by an encoder 702. As but one example, received data may have a particular number of bits, and corresponding transmitted data may have a different number of bits. Particularly, a data value received by an encoder 702 may have fewer bits than a corresponding encoded data value transmitted by an encoder 702. Even more particularly, an encoder 702 may receive 8-bit data values and encode such values into 10-bit data values for transmission over lane 710.

When an IDLE CNTL 0 signal 704 indicates that corresponding lane 0 710 is idle and control signal LANE CNTL 0 706 indicates that a lane is a first lane of a lane group, an encoder 702 may transmit a "first" lane idle code. A first lane idle code can be a particular set of bits (e.g., IDLE A). Further, in very particular embodiments, a first lane idle code may vary according to a periodic signal (e.g., IDLE A0 or IDLE A1).

When an IDLE CNTL 0 signal 704 indicates that corresponding lane 0 710 is idle and a control signal LANE CNTL 0 706 indicates that a lane is not a first lane of a lane group, an encoder 702 may transmit a "subsequent" lane idle code. A subsequent lane idle code can be a particular set of bits that is different than a first lane idle code (e.g., IDLE B). Further, in very particular embodiments, a subsequent lane idle code may vary according to a periodic signal (e.g., IDLE B0 or IDLE B1).

In this way, data or idle codes may be transmitted through signal lines that not only represent an idle state or data transmit state, but can also indicate different configurations for the lane groups.

Figure 8:
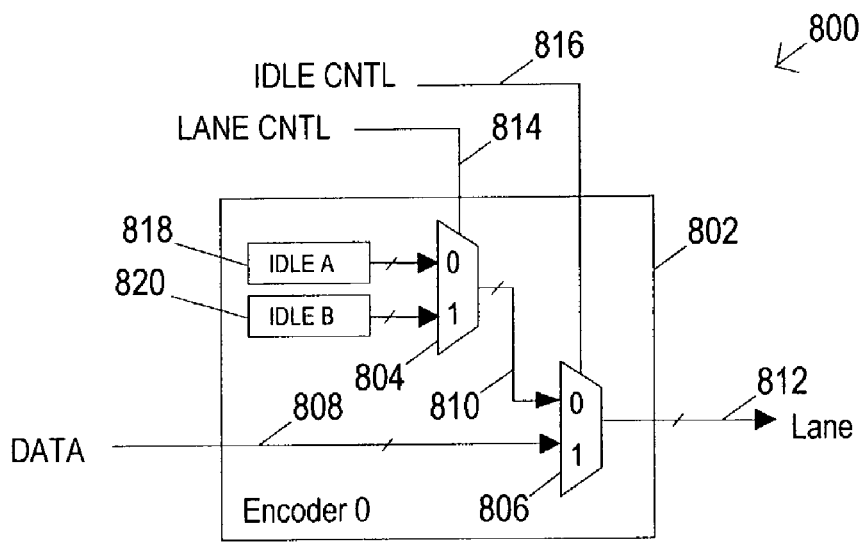
FIG. 8 is a diagram of an encoder according to a fifth embodiment of the present invention.
Figure 9A:
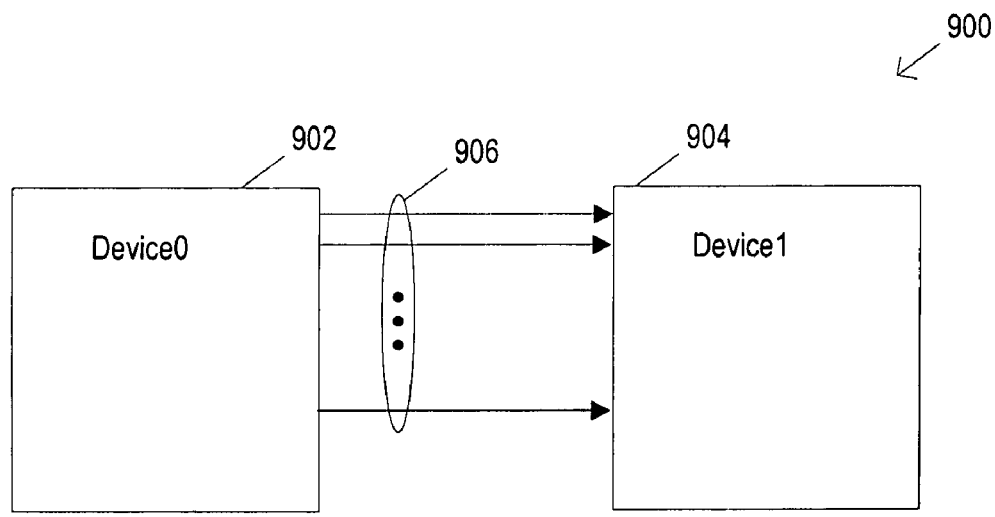
FIG. 9A is a block diagram of a conventional data communication system.
Figure 9B:
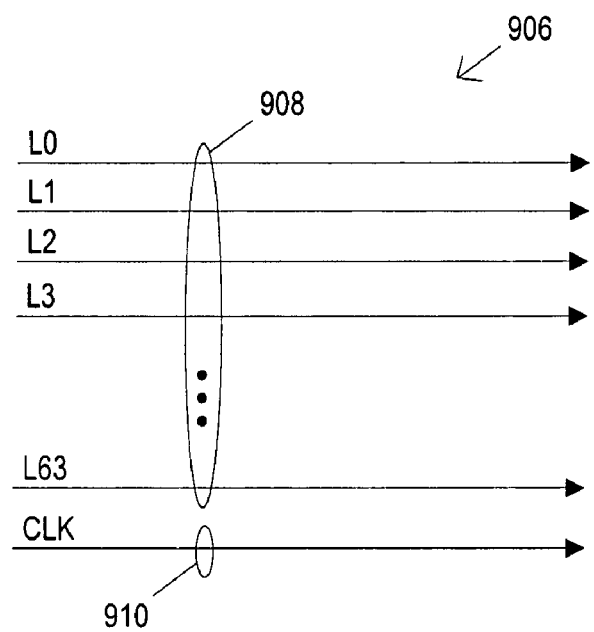
FIG. 9B shows a group of signal lanes in a conventional data communication system.
Figure 9C:
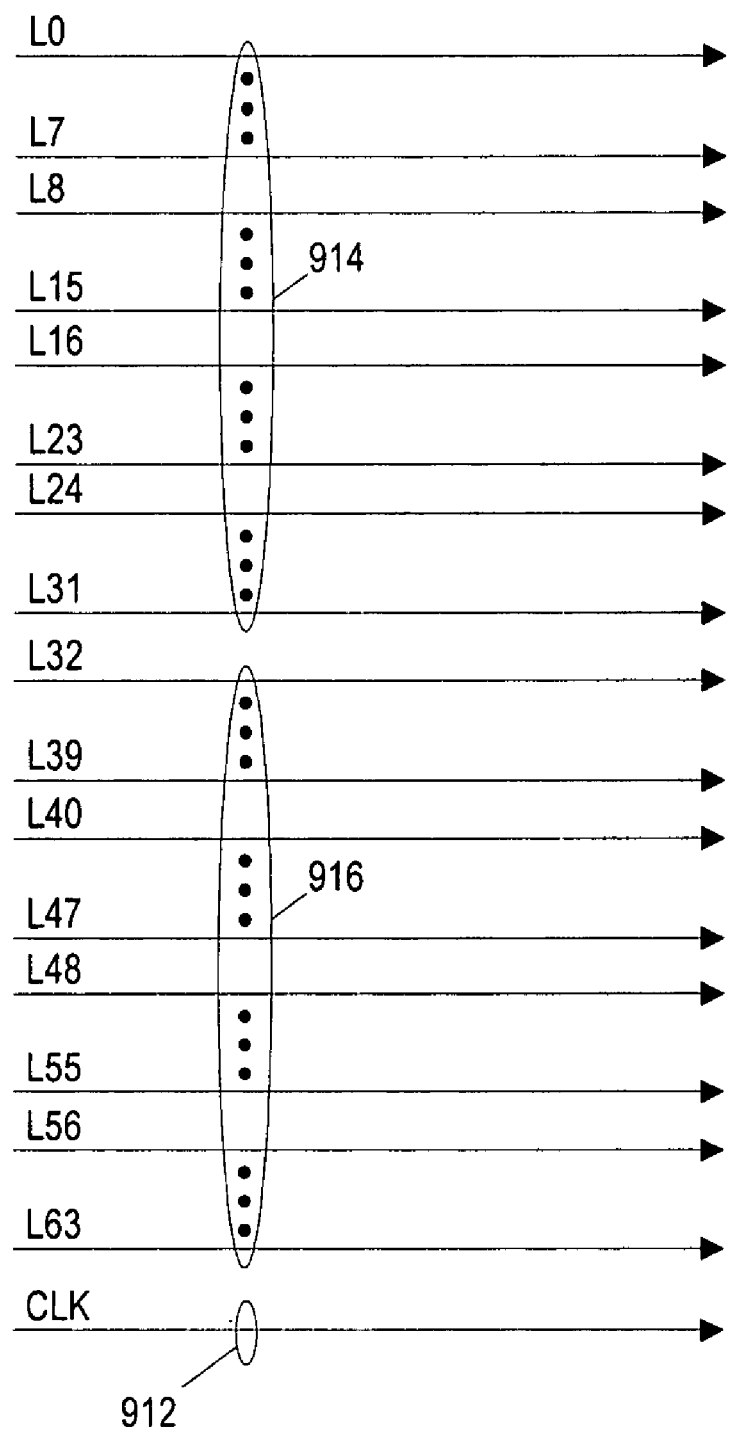
FIGS. 9C to 9E are examples of different configurations of data lines according to a conventional approach.
Figure 9D:
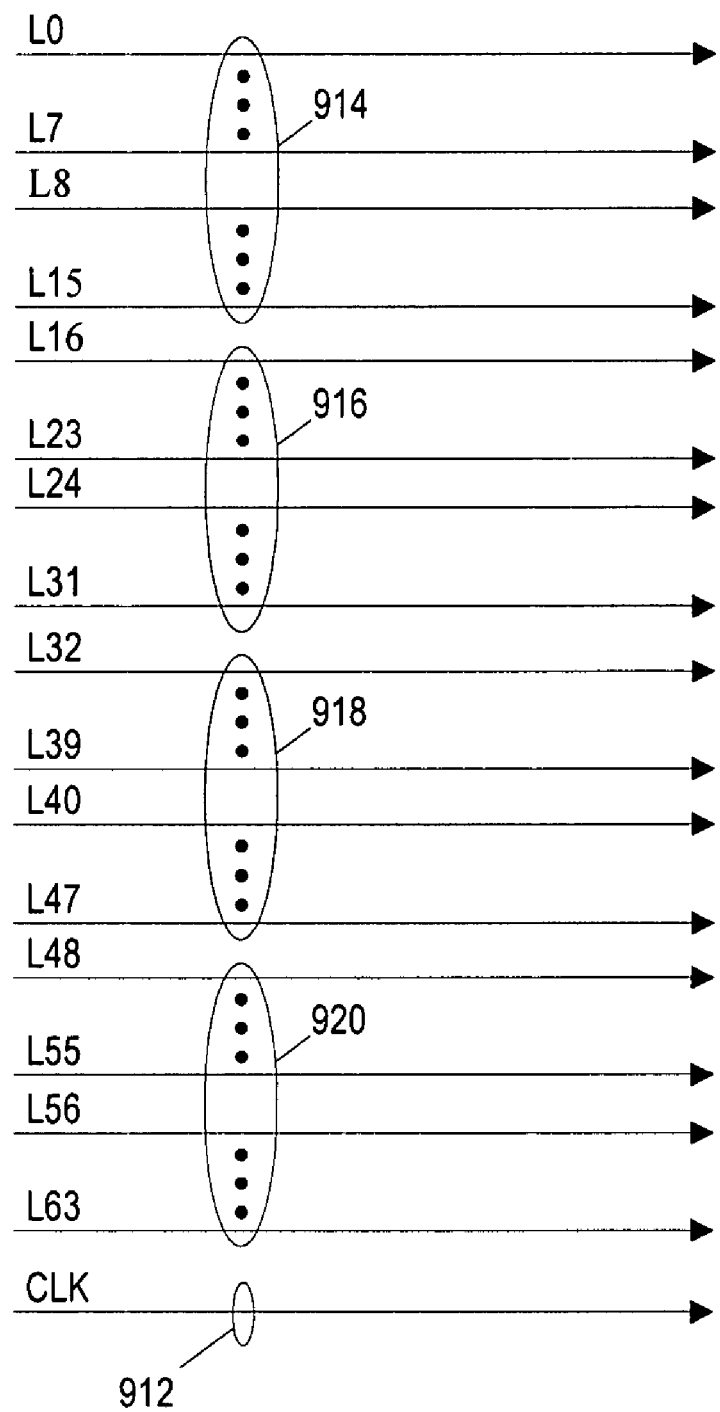
Figure 9E:
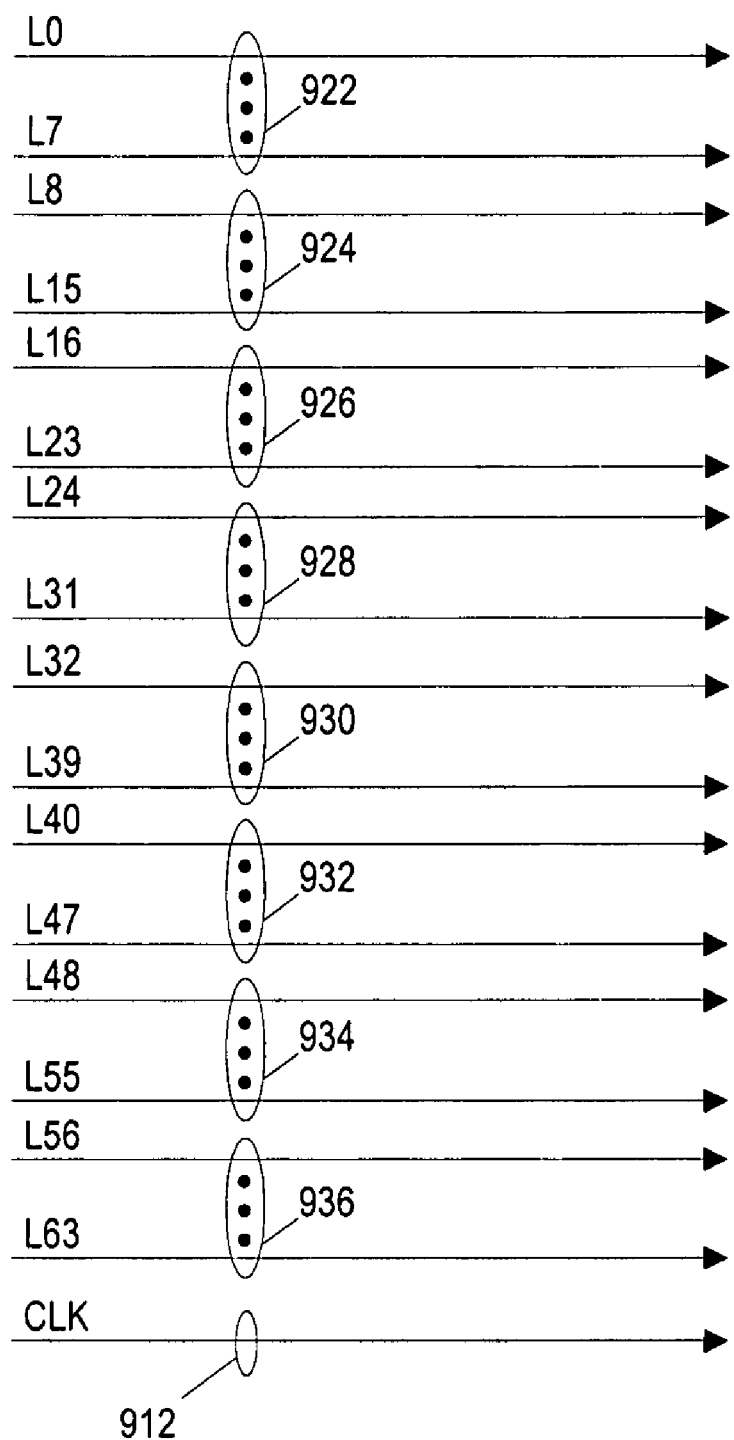
Figure 9F:
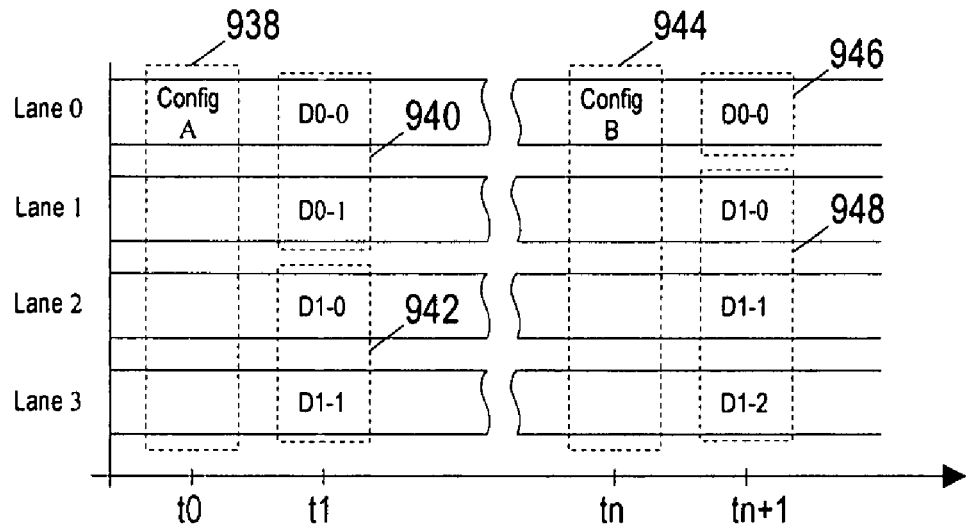
FIG. 9F shows a conventional approach for arranging signal lanes into particular configurations.
Figure 9G:
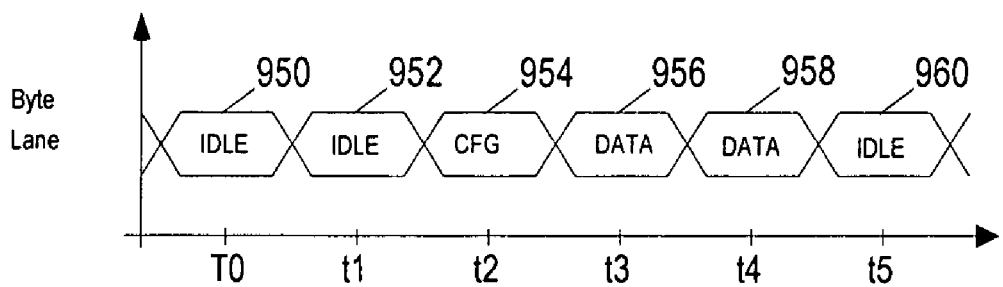
FIG. 9G is a timing diagram showing configuration, data and idle codes according to a conventional data communication system.

Referring now to FIG. 8, one example of an encoder circuit according to an embodiment is shown in a block diagram and designated by the general reference number 800. An encoder 800 may include an idle code multiplexer (MUX) 804, a data select MUX 806, a data bus 808, an idle code bus 810, an output lane 812, a lane control line 814, an idle control line 816, a first lane idle code source 818 IDLE A, and a subsequent lane idle code source 820 IDLE B.

An idle code MUX 804 may receive a first lane idle code from a source 818 and a subsequent lane idle code from a source 820. An idle code MUX 804 may output a first or subsequent lane idle code on idle code bus 810 according to a signal on lane control line 814. In the very particular example of FIG. 8, if lane control line 814 is low, a first lane may be indicated and idle code MUX 804 may output a first lane idle code on idle code bus 810. If lane control line 814 is high, a subsequent lane may be indicated and idle code MUX 804 may output a subsequent lane idle code on idle code bus 810. That is, a MUX 804 may be one representation of a controllable data path that may provide one of at least two idle codes.

In this way, a predetermined idle control signal may be generated according to a lane control indication.

A data select MUX 806 may receive an idle code on idle code bus 810 and a data value on data bus 808. A data select MUX 806 may output an idle code or a data code according to a signal on idle control line 816. In the very particular example of FIG. 8, if idle control line 816 is low, a data select MUX 806 may output an idle code on output 812. If idle control line 816 is high, a data select MUX 806 may output a data code on output lane 812.

In this way, a data value or an idle value may be generated according to an idle control indication. Such an idle value may indicate a lane grouping configuration.

In particular embodiments, idle code values (e.g., IDLE A, IDLE B, IDLE A0, IDLE A1, IDLE B0, IDLE B1) may have bit values selected for operating environments. More particularly, idle code value may be selected to encode into values that reduce electromagnetic interference in particular operating environments and/or have particular minimum "DC" components. As is well understood, a DC component may represent or correlate to an overall sum of "1's" versus "0's."

In one particular example, encoded idle codes may be generated by encoding predetermined 8-bit idle code values into 10-bit encoded values. One very particular 10-bit encoded value can have the particular bit values of "11001 11000"

While particular approaches to indicating lane grouping have been set forth herein, other embodiments may include various alternate configurations. As but one example, each lane group may have a unique idle code. Thus, an encoder may receive multiple idle different codes, and transmit idle codes that are the same for all lanes of a group, but different between lane groups (e.g., IDLE A, IDLE B, IDLE C . . . ).

In particular embodiments, such lane group specific codes could also vary according to a strobe signal, or the like (e.g., IDLE A0/1, IDLE B0/1, IDLE C0/1, etc.).

Thus, while the embodiments set forth herein have been described in detail, it should be understood that the present invention could be subject to various changes, substitutions, and alterations without departing from the spirit and scope of the invention. Accordingly, the present invention is intended to be limited only as defined by the appended claims.

What is claimed is:

1. A method, comprising the steps of:
   transmitting at least one idle code on a plurality of signal lines to indicate a predetermined data transmission configuration for the signal lines; and
   transmitting the at least one idle code includes outputting one of at least two idle codes according to a lane indication that signifies when predetermined signal lines are a first portion of a group or a subsequent portion of the group.

2. The method of claim 1, wherein:
   transmitting the at least one idle code includes transmitting a first idle code on a first portion of a group of signal lines, and transmitting a second idle code different than the first idle code on a second portion of the same group of signal lines.

3. The method of claim 1, further including:
   transmitting a plurality of idle codes, each idle code being transmitted on a corresponding lane that includes a plurality of signal lines.

4. The method of claim 3, wherein:
   the at least one idle code includes at least a first lane idle code that indicates a first lane in a group of lanes and a subsequent idle code that indicates a subsequent lane in a group of lanes.

5. The method of claim 1, wherein:
   transmitting at least one idle code includes transmitting one idle code when a periodic signal has a first value and transmitting a different idle code when the periodic signal has a second value.

6. The method of claim 1, wherein:
   transmitting the at least one idle code includes outputting data or idle codes according to an idle indication that signifies when predetermined signal lines are idle.

7. The method of claim 6, wherein:
   outputting data includes outputting a data code corresponding to a received data value when a periodic signal has a first value and outputting the complement of the data code corresponding to the received data value when the periodic signal has a second value.

8. The method of claim 1, wherein:
   transmitting the at least one idle code includes outputting one of at least two idle codes according to a lane indication that signifies when predetermined signal lines are a first portion of a group or a subsequent portion of the group.

9. A data transmission system, comprising:
at least one encoder that outputs one of at least two idle codes on signal lines according to a predetermined signal line configuration information during an idle state, the signal line configuration information indicating when the signal lines are a first portion of a signal line group or a subsequent portion of the signal line group.

10. The data transmission system of claim 9, wherein:
at least two idle code sources and a data bus are coupled to the at least one encoder.

11. The data transmission system of claim 9, wherein:
at least one lane control line is coupled to the at least one encoder that provides signal line configuration information.

12. The data transmission system of claim 11, wherein:
the at least one encoder includes a controllable data path that provides a first idle code when the signal line configuration information indicates the first portion of a group of signal lines, and provides a second idle code when the signal line configuration information indicates the subsequent portion of the group of signal lines.

13. The data transmission system of claim 9, wherein:
the at least one encoder is coupled to at least one idle control line that indicates the idle state.

14. The data transmission system of claim 9, wherein:
a data bus is coupled to the at least one encoder that provides data values.

15. The data transmission system of claim 9, wherein:
the at least one encoder includes a plurality of encoders, each coupled to a plurality of signal lines comprising a lane, each lane including at least one strobe line for transmitting a periodic signal.

16. The data transmission system of claim 15, wherein:
the at least one encoder includes a controllable data path between at least two idle code sources and an output bus enabled according to a strobe line signal.

17. A coding system, comprising:
communication links configurable into a plurality of data lanes; and
a set of code values configured for idle communication links, the set of code values including at least a first code value designating a first portion of a data lane and a second code value designating remaining portions of the data lane.

18. The coding system of claim 17, wherein
the links include a plurality of data lanes, at least a first code value designating a first portion of a data lane.

19. The coding system of claim 18, wherein
at least a second code value designating remaining portions of a data lane.

20. The coding system of claim 17, wherein
the communication links include at least one clock link and data links,
the at least one clock link transmits a periodic signal having at least a first signal portion and a second signal portion; and
the data links transmit encoded data values on first and second portions of the periodic signal when transmitting data, and transmit the same code value when idle.

21. The coding system of claim 17, wherein
the communication links include at least one clock link and data links,
the at least one clock link transmits a periodic signal having at least a first signal portion and a second signal portion; and
the data links transmit encoded data values on first and second portions of the periodic signal when transmitting data, and transmit idle code pair when idle.

* * * * *

UNITED STATES PATENT AND TRADEMARK OFFICE
CERTIFICATE OF CORRECTION

PATENT NO. : 7,301,961 B1  Page 1 of 1
APPLICATION NO. : 10/209142
DATED : November 27, 2007
INVENTOR(S) : David V. James and Jagadeesan Rajamanickam It is certified that error appears in the above-identified patent and that said Letters Patent is hereby corrected as shown below:

At column 10, line 36, please replace "A1526" with -- A1 526 --

At column 10, line 38, please replace "A1528" with -- A1 528 --

At column 11, line 29, please replace "A1538" with -- A1 538 --

Signed and Sealed this

Third Day of June, 2008

JON W. DUDAS
*Director of the United States Patent and Trademark Office*